Dec. 4, 1962     H. WHITE     3,066,959
VENT PIPES CONCURRENTLY LOCKED AGAINST
AXIAL AND ROTATIONAL DISPLACEMENT
Filed Dec. 29, 1958
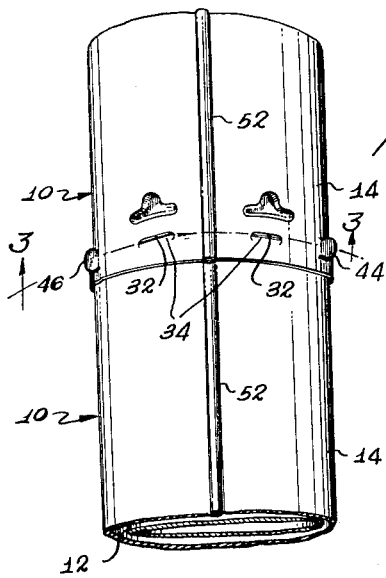
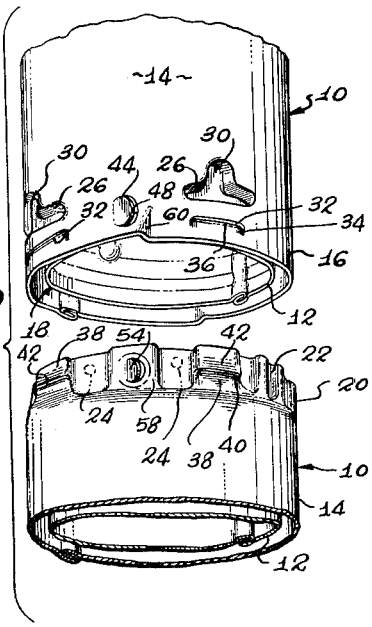
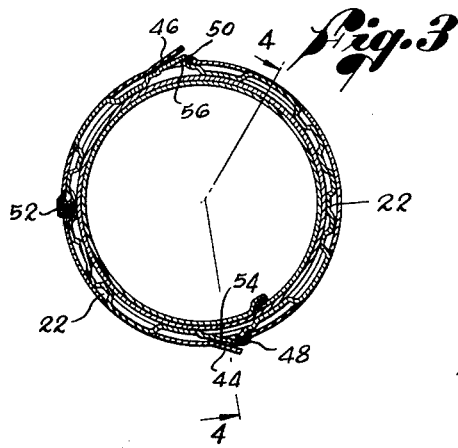
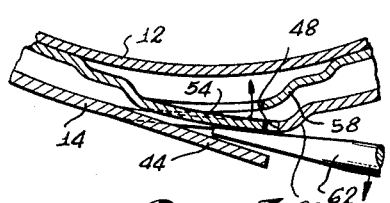
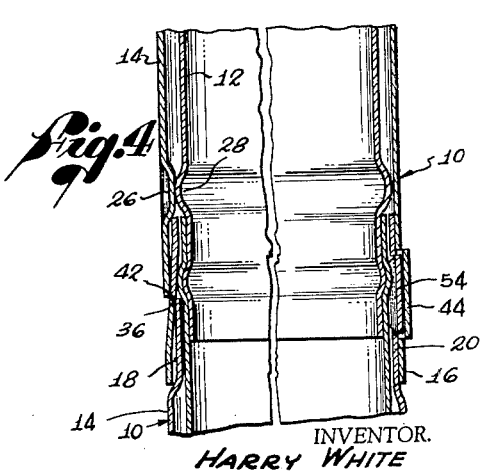
INVENTOR.
HARRY WHITE Patented Dec. 4, 1962

3,066,959

United States Patent Office 3,066,959
VENT PIPES CONCURRENTLY LOCKED AGAINST AXIAL AND ROTATIONAL DISPLACEMENT
Harry White, 5401 Josephine, Lynwood, Calif.
Filed Dec. 29, 1958, Ser. No. 783,513
10 Claims. (Cl. 285—81)

The present invention relates generally to vent pipes for gas appliances or the like and more particularly to sections of vent pipe that can readily be assembled and disassembled.

An object of my invention is to provide a vent pipe construction by means of which relatively short sections of vent pipe can very easily and quickly be assembled into a continuous stack.

Another object of the present invention is to provide a vent pipe construction by means of which relatively short sections of vent pipe can be releasably locked together in continuous coaxial relationship merely by slipping a pair of sections together.

A further object of the invention is to provide a vent pipe construction in which short sections of vent pipe are provided with complementary male and female opposite ends, the ends having automatically engageable latching means to prevent axial separation and relative angular movement of a pair of joined sections.

Another important object of my invention is to provide a vent pipe construction having complementary male and female opposite ends having latching or interlocking means, a portion of which can be disconnected to permit axial separation of a pair of previously joined sections.

The invention also has for an object thereof a vent pipe construction in which relatively short sections are each made of an inner liner surrounded by an outer jacket, the liner and jacket having complementary opposite male and female ends for coupling a pair of vent pipe sections.

These and other objects and advantages of my invention will be apparent from the following description of a presently preferred embodiment thereof when taken in conjunction with the annexed drawing in which:

FIGURE 1 is a perspective view of a portion of a completed stack utilizing relatively short sections of vent pipe embodying my invention;

FIGURE 2 is a partial perspective view of a pair of vent pipe ends in coaxial but spaced-apart relationship prior to assembly, and particularly illustrating details of construction of both the male and female ends;

FIGURE 3 is a sectional view taken along the line 3—3 of FIGURE 1;

FIGURE 4 is an axial sectional view taken along the line 4—4 of FIGURE 3; and

FIGURE 5 is a partial sectional view illustrating the manner in which one of the sets of complementary interlocking means of the male and female pipe ends is disconnected to permit axial separation of a pair of previously joined sections.

In the drawing, a section of my improved vent pipe is indicated generally by the numeral 10 and comprises an inner liner 12 and an outer jacket or pipe 14. The liner 12 is substantially smaller in diameter than jacket 14 but is held in assembled coaxial relationship by means which will later be described. It will be observed that at the lower or female end 16 of each vent pipe 10 an unobstructed annular space 18 is preserved between the liner 12 and jacket 14 into which the upper or male end 20 of another identical section of pipe 10 is telescopically inserted, the upper ends of both the liner 12 and jacket 14 being received within the space 18. It will, of course, be understood that each vent pipe 10 is formed at one end with a male end 20 and at the other end with a female end 16.

In general, the complementary male and female ends of each section of pipe 10 have parts of two sets of interlocking or unidirectional abutment means. One of these sets is adapted to prevent axial separation only of a pair of joined sections 10 while the other set is adapted to prevent relative angular movement of two joined sections. The arrangement is such that when the cooperative portions of each set of abutment or interlocking means are in axial alignment, a male and female end can be telescopically joined together and the cooperating parts of each set of abutment means will automatically snap into abutting engagement. The two sections of pipe will thereafter be rigidly interconnected but if it is desired for and reason to disassemble the two sections of pipe 10, a portion of one of the sets of abutment means can be moved out of confronting relationship with its cooperating abutment. The two joined pipe sections then can be relatively rotated to move all of the abutment portions out of alignment to thereafter permit axial separation of the two sections.

More specifically, and with particular reference to FIGURE 2, it will be seen that the male end 20 is reduced in diameter, as by crimping generally indicated at 22, to adapt male end 20 for slidable reception within the substantially normal internal diameter of the jacket 14 of female end 16. That end of the liner 12, however, adjacent the male end 20 is enlarged to contact the inner surface of the male end 20 with its outer surface and to provide a female receptacle for the lower end of the liner 12 at the female end 16 of the vent pipe. A plurality of spot welds 24, or the like, permanently interconnect the male end 20 and the same end of liner 12, the welds 24 being located within the relatively wide crimped portions of the outer jacket 14 shown in FIGURE 2.

At the lower or female end 16, the outer jacket 14 is formed with a plurality of equally circularly spaced-apart indentations 26 that are generally T-shaped in configuration. These indentations extend inwardly to a depth almost the same as the radial width of the annular space between the jacket 14 and liner 12 and serve to loosely maintain the lower end of liner 12 in coaxial relationship with the outer jacket or pipe 14. Thus, when a vent pipe 10 is mounted in generally vertically extending position with the male end 20 uppermost, the liner 12 is in effect suspended from the spot welds 24. Referring to FIGURE 4, it will be observed that the lower end of liner 12 immediately opposite indentations 26 may be formed with a slight or shallow outwardly projecting groove indicated at 28 to further limit the extent to which the lower end of the liner 12 can shift relative to the axis of the jacket 14. For indicating the upper and lower ends of the vent pipe 10 an upwardly pointing stem 30 can be formed with the indentation 26 so that the user may readily identify the ends of the vent pipe without the necessity of a close inspection.

In the female end 16 beneath each indentation 26 a circularly extending slit 32 is formed in jacket 14. That portion of the wall of jacket 14 lying between the slit 32 and indentation 26 is of normal configuration, that is, it has the same diameter as the normal diameter of the jacket 14. However, that portion of the wall of jacket 14 beneath the slit 32 and the extreme lower end of jacket 14 is depressed as indicated at 34 to provide an upwardly facing abutment or lip 36 comprising that side of edge of the slit 32 which is depressed inwardly beyond the inner surface of the jacket 14.

In the male end 20, the jacket 14 is formed with a plurality of short flutes, generally designated by the numeral 38, each of which is in axial alignment with a slit 36 at the female end 16 of the same section of vent pipe 10. Each of the flutes 38 is subtended by a circularly extending slit 40 and that portion of the flute between the slit 40 and the extreme upward edge of the jacket 14 is outstruck or outwardly offset to provide a downwardly facing abutment or lip 42. Thus when a pair of vent pipes 10 are coaxially positioned as shown in FIGURE 2, with the lips 36 of a female end in axial alignment with the lips 42 of a male end, the two sections of pipe can be telescopically slid together. The lips 36 and 42 yield to one another as they override one another, due to the resilient nature of the sheet metal material employed, and then snap into place, it being understood that the diameters defined by the lips 42 and 36 are substantially the same. The set of lips 42 are thus in confronting relation to the set of lips 36 so as to prevent axial separation of the two joined sections of pipe, so long as the lips are held in alignment with one another.

The female end 16 is formed with a pair of diametrically opposite outstruck tabs 44 and 46 in the wall of the jacket 14, each of these tabs being positioned between a pair of the indentations 26. The formation of the tabs 44 and 46 leaves apertures in the side wall of the jacket 14 having in each case an arcuate edge 48 and 50, respectively. It will be observed from FIGURE 3 that the tabs 44 and 46, and accordingly the edges or abutments 48 and 50, respectively, extend away from the side wall of the jacket 14 in opposite directions relative to a seam 52 of the jacket. The seam 52 then serves as a convenient means for arranging all of the cooperative parts of both sets of locking abutments in the proper axial alignment for assembling them.

The male end 20 in its jacket 14 is formed with a similar pair of diametrically opposite outstruck tabs 54 and 56. Each of the tabs 54 and 56 on each section of vent pipe 10 is in axial alignment with the tabs 44 and 46, respectively, of the female end 16 and in the same relation or direction relative to the seam 52. It will be seen from FIGURE 2 that the tabs 54 and 56 are formed out of short flutes 58 and the female end 16 adjacent the free end of the tabs 44 and 46 has a short edge crimp 60 in axial alignment with one side of the short flutes 58. These edge crimps 60 serve as guides in insuring the proper alignment of the tabs 44 and 46 and the inner tabs 54 and 56.

The inner tabs 54 and 56 protrude outwardly a sufficient distance to penetrate the apertures left by the formation of the outer tabs 44 and 46. Accordingly, when a male end 20 is slipped into a female end 16, the inner tabs 54 and 56 are resiliently deformed inwardly until they register with these apertures at which time they snap outwardly to engage the edges 48 and 50 of these apertures. As an examination of FIGURE 3 will show, the two joined pipe sections 10 are thereafter held against relative angular movement in either direction since each of the tabs 54 and 56 acts as a unidirectional abutment in opposite directions. Thus, in FIGURE 3, the tab 56 prevents clockwise relative movement of the male end 20, while the other inner tab 54 prevents counterclockwise rotation.

In the use of the invention a pair of the vent pipe sections 10 are brought into coaxial alignment with the female end 16 of one section confronting the male end 20 of the other section. At this time, care must be taken to insure that the seams 52 of the two sections are in alignment to insure that each of the lips 36 is in alignment with one of the lips 42 and particularly to insure that the tabs 44 and 46 are in alignment, in the same direction respectively, with the tabs 54 and 56. Thereafter, the two sections are merely slid together and securely locked in place when the lips 36 and 42 snap into confronting abutment. The inner tabs 54 and 56 after first being momentarily inwardly deflected will snap into the apertures of the outer tabs 44 and 46, respectively, and thereafter prevent relative angular movement of the two joined sections.

In the event that it becomes necessary to disassemble the two joined sections a screwdriver or like tool 62 is inserted under either one of the outer tabs 44 and 46 in the manner shown in FIGURE 5. Either one of the inner tabs 54 and 56 can then be depressed to clear edges 48 and 50, respectively, of the apertures and one of these sections is then permitted to rotate relative to the other vent pipe section. Thus, in FIGURE 5 after the tab 54 has been depressed, the male end 20 can be rotated counterclockwise as viewed in this figure relative to the female end 16. This results in moving the lips 36 of the female section out of confronting relationship with the lips 42 of the male section after which the two vent pipe sections 10 can be axially separated.

While the preferred embodiment of this invention has been shown and described, it is to be understood that the invention is not to be limited to the details illustrated and described except as defined by the appended claims.

I claim:

1. A vent pipe construction which includes a male pipe end and a mating female pipe end, said ends having a plurality of complementary axially alignable means to prevent axial separation of said ends when engaged, and said ends having second complementary axially alignable means to prevent relative angular movement of said ends when said ends are engaged and said first and second means being positioned and arranged for concurrent axial alignment of their complementary portions, said second means being selectively releasable to permit such angular movement to move complementary portions of said first means out of axial alignment and out of engagement to allow subsequent axial separation of said ends.

2. A vent pipe construction which includes a male pipe end and a mating female pipe end, said ends having cooperating axially alignable portions that when engaged with one another prevent axial separation only of said pipe ends, said ends also having other cooperating portions that are axially aligned concurrently with axial alignment of said first cooperating portions and that when engaged prevent relative angular movement only of said pipe ends, said other portions being cooperatively engageable with one another only when said first mentioned cooperating portions are engaged, at least one of said first and other cooperating portions being selectively disengageable to permit relative movement of said pipe ends in a direction to move the remaining cooperating portions out of engagement and to permit axial separation of said ends.

3. A vent pipe construction which includes a male pipe end and a mating female pipe end, said ends having axially alignable, axially oppositely facing abutment portions adapted for overriding one another when said ends are matingly moved together and adapted to confront one another when said ends are joined to prevent axial separation of said ends, said ends also having generally axially extending abutment portions adapted to confront one another only when said first abutment portions confront one another to prevent relative angular movement of said ends, at least one of said axially facing and said axially extending abutment portions being selectively movable out of confronting position to permit relative movement of said ends in a direction to move the others of said abutment portions away from confronting positions to permit axial separation of said pipe ends.

4. A vent pipe construction which includes a male pipe end and a mating female pipe end, said ends having a plurality of circumferentially spaced apart axially alignable, resiliently deformable and axially oppositely facing lips adapted for overriding one another when said pipe ends are telescopically moved together to dispose said lips in confronting relationship to thereafter prevent axial separation of said ends, said ends also having generally axially extending abutment portions adapted to confront one another to prevent relative angular movement of said pipe ends only when said lips confront one another, one of said abutment portions comprising an edge of an opening formed in the wall of said female end, the other of said abutment portions being an outstruck tab of said male end receivable in said opening of said female end that is accessible through said opening to be selectively movable out of confronting position to permit relative rotation of said ends to shift said lips out of axial alignment after which said pipe ends can be axially separated.

5. A vent pipe construction which includes a male pipe end and a mating female pipe end, said ends having a plurality of circumferentially spaced apart axially alignable, axially oppositely facing abutment portions adapted for overriding one another when said pipe ends are matingly moved together and adapted to confront one another when said ends are joined to prevent axial separation of said pipe ends, one of said pipe ends also having a resilient integral tab offset from the wall of said pipe end adapted to confront an axially extending abutment formed in the other of said ends to unidirectionally prevent relative rotation of said pipe ends only when said first abutment portions confront one another, said tab being movable out of confronting position to permit relative rotation of said ends to move said first abutment portions out of axial alignment after which said ends can be axially separated.

6. A vent pipe construction which includes a male pipe end and a mating female pipe end, said ends having a plurality of circumferentially spaced apart and axially alignable, resiliently deformable and axially oppositely facing lips formed therein adapted for overriding one another when said ends are telescopically moved together to dispose said lips in confronting relationship to thereafter prevent axial separation of said ends, said male end also having a pair of circumferentially oppositely extending resilient tabs offset from the wall of said male pipe end adapted to confront one of a pair of axially extending abutments formed in said female end, each tab unidirectionally preventing relative rotation of said pipe ends only when said lips confront one another, either of said tabs being movable out of confronting position to unidirectionally permit relative rotation of said ends to move said lips out of axial alignment after which said ends can be axially separated.

7. A vent pipe construction which includes a male pipe end and a mating female pipe end, each of said ends having a plurality of circularly extending, circularly spaced-apart, resiliently deformable lips, each of the lips on one of said ends being axially alignable with the lips on the other of said ends and the lips of one of said ends facing axially oppositely to the lips on the other of said ends, axially aligned pairs of said lips being adapted for overriding one another during assembly of said ends to thereafter confront one another to prevent axial separation only of said ends, each of said ends also having a pair of diametrically opposite integral tabs outstruck from the wall thereof, each tab of each pair extending oppositely to the other tab of said pair, the tabs of one of said ends being axially aligned with the tabs of the other of said ends only when said lips of said ends are in alignment and the tabs on one of said ends overlying the pair of tabs on the other of said ends only when said lips are in confronting positions, each of the innermost of said tabs extending into the aperture of the tab thereabove to unidirectionally prevent relative rotation of said ends, said innermost tabs being accessible under an outermost tab to be depressible out of said aperture to permit relative rotation of said ends to shift said lips out of confronting positions after which said ends can be axially separated.

8. A double-walled vent pipe construction, comprising: an outer jacket having a coaxial inner liner, said outer jacket having a reduced diameter upper end portion in engagement with and affixed to an enlarged diameter upper end portion of said liner whereby said liner is suspended in said jacket, said jacket and liner adjacent their lower ends having contacting portions adapted to maintain said jacket and liner in coaxial alignment, said jacket and liner in the axially extending portions thereof below said contacting portions defining an annulus within which the upper ends of the jacket and liner of an identical double-walled vent pipe is receivable, the male and female ends of said jacket having a plurality of complementary axially alignable means comprising integral portions of said ends adapted to prevent axial separation of said male and female jacket ends when said portions are engaged, and said male and female jacket ends having second complementary axially alignable means comprising integral portions of said ends adapted to prevent relative angular movement of said jacket ends in at least one direction only when said portions of said first mentioned means are engaged, one of said portions of said second means being selectively releasable from engagement with another portion of said second means to permit such angular movement to move complementary portions of said first means out of axial alignment and out of engagement to allow subsequent axial separation of said jacket ends.

9. A double-walled vent pipe construction, comprising: an outer jacket having a coaxial inner liner, said outer jacket having a reduced diameter upper end portion in engagement with and affixed to an enlarged diameter upper end portion of said liner whereby said liner is suspended in said jacket, said jacket and liner adjacent their lower ends having contacting portions adapted to maintain said jacket and liner in coaxial alignment, said jacket and liner in the axially extending portions thereof below said contacting portions defining an annulus within which the upper ends of the jacket and liner of an identical double-walled vent pipe is receivable, the male and female ends of said jacket having a plurality of circumferentially spaced apart and axially alignable, resiliently deformable and axially oppositely facing lips formed therein adapted for overriding one another when male and female jacket ends are telescopically moved together to dispose said lips in confronting relationship to thereafter prevent axial separation of said ends, said male jacket end also having a pair circumferentially oppositely extending resilient tabs outwardly offset from the wall of said male jacket end and adapted to confront one of a pair of axially extending abutments, said abutments comprising edges of a pair of apertures formed in a female jacket end and in which apertures said tabs are receivable, each tab confronting an abutment to unidirectionally prevent relative rotation of said jacket ends only when said lips confront one another, either of said tabs being movable radially inwardly out of an aperture and out of confronting position to permit relative rotation of said ends to move said lips out of axial alignment after which said jacket ends can be axially separated.

10. A double-walled vent pipe construction as set forth in claim 10 in which said jacket is formed with a longitudinally extending seam that is equally circumferentially spaced apart from said tabs.

References Cited in the file of this patent

UNITED STATES PATENTS

| | | |
|---|---|---|
| 839,297 | Kennedy et al. | Dec. 25, 1906 |
| 1,053,743 | Paiste | Feb. 18, 1913 |
| 1,308,981 | Buller | July 8, 1919 |
| 2,444,892 | Kelly | July 6, 1948 |
| 2,537,284 | Schuder | Jan. 9, 1951 |
| 2,712,950 | Siebert | July 12, 1955 |
| 2,894,537 | Carr | July 14, 1959 |
| 2,910,308 | Carr | Oct. 27, 1959 |
| 2,910,311 | Carr | Oct. 27, 1959 |
| 2,936,184 | Epstein | May 10, 1960 |